United States Patent
Masek et al.

[11] Patent Number: 6,163,974
[45] Date of Patent: Dec. 26, 2000

[54] POSITION SENSOR

[75] Inventors: Ivan Masek, Stuttgart; Rainer Utz, Ostfildern, both of Germany

[73] Assignee: Horst Siedle GmbH & Co. KG, Furtwangen, Germany

[21] Appl. No.: 09/142,819

[22] PCT Filed: Mar. 8, 1997

[86] PCT No.: PCT/DE97/00456

§ 371 Date: Sep. 14, 1998

§ 102(e) Date: Sep. 14, 1998

[87] PCT Pub. No.: WO97/34308

PCT Pub. Date: Sep. 18, 1997

[30] Foreign Application Priority Data

Mar. 13, 1996 [DE] Germany .................. 196 09 897
Mar. 13, 1996 [DE] Germany .................. 296 04 673 U

[51] Int. Cl.[7] .................................................. G01B 7/28
[52] U.S. Cl. ................... 33/706; 33/1 PT; 33/549; 33/558; 33/561
[58] Field of Search ............... 33/706, 561, 549, 33/554, 707, 708, 556, 558, 559, 503, 1 M, 1 PT; 324/207.24, 207.25, 207.11

[56] References Cited

U.S. PATENT DOCUMENTS

| 4,649,623 | 3/1987 | Schneider et al. | 483/69 |
| 4,777,818 | 10/1988 | McMurtry | 73/1.79 |
| 4,780,961 | 11/1988 | Shelton et al. | 33/503 |
| 5,048,194 | 9/1991 | McMurtry | 33/558 |
| 5,101,548 | 4/1992 | McMurtry et al. | 483/62 |
| 5,222,034 | 6/1993 | Shelton et al. | 702/152 |
| 5,505,005 | 4/1996 | McMurtry et al. | 33/561 |

FOREIGN PATENT DOCUMENTS

| 197710 | 10/1977 | U.S.S.R. | 33/645 |

*Primary Examiner*—Diego Gutierrez
*Assistant Examiner*—Maria Fernandez
*Attorney, Agent, or Firm*—Cohen, Pontani, Lieberman & Pavane

[57] ABSTRACT

A position sensor having a housing which defines a carriage guide, a carriage movably arranged in the guide, and a measurement probe arranged on the carriage for transmitting a measurement signal as a function of a position of the carriage. The measurement probe includes a measurement probe carrier separated from the carriage and the carriage guide and movably arranged in the housing. The measurement probe carrier is also connected to the carriage and the carriage guide so that a force can only be transmitted to the measurement probe carrier parallel to a movement direction.

8 Claims, 1 Drawing Sheet

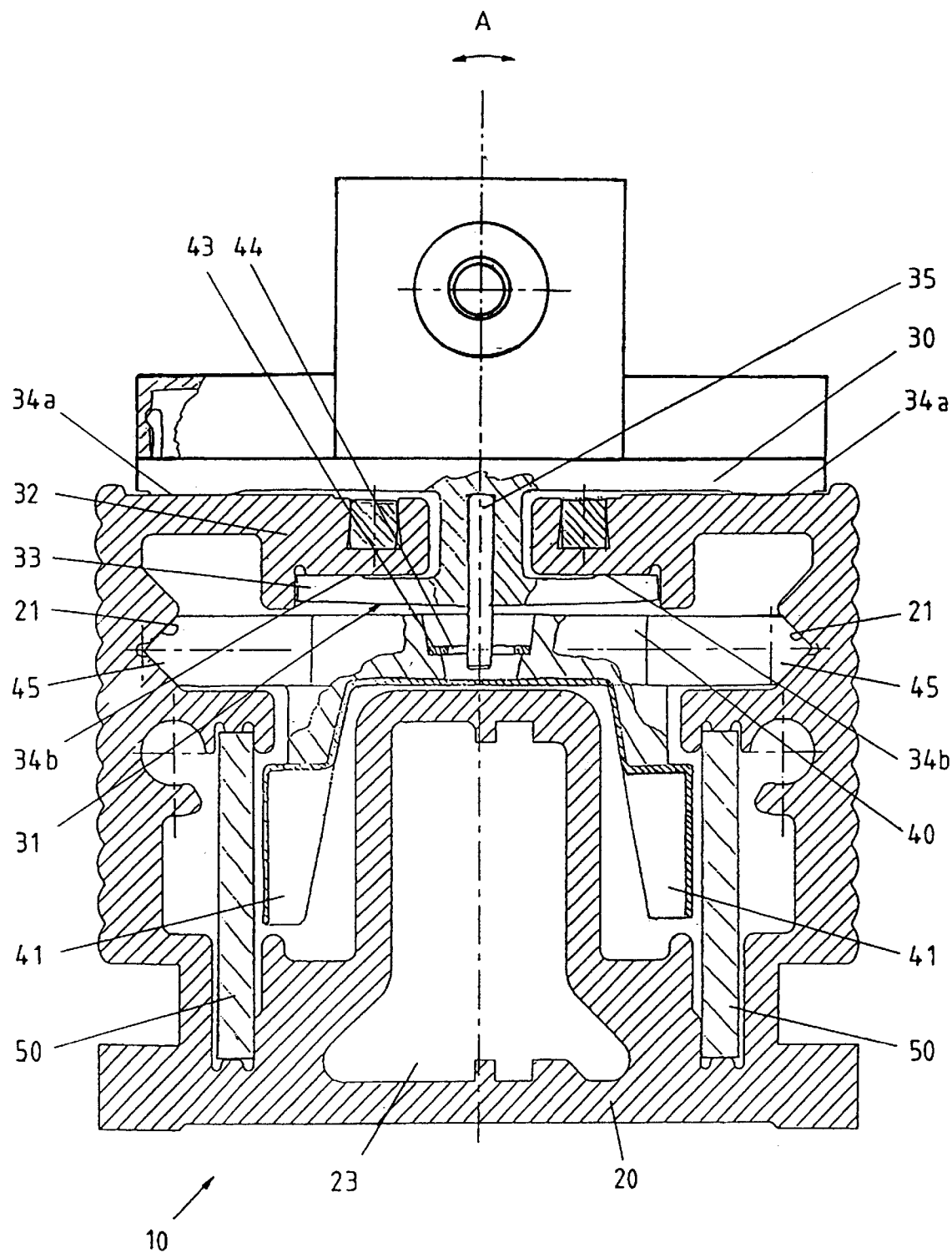

POSITION SENSOR

BACKGROUND OF THE INVENTION

1. Field of the Invention

The invention relates to a position sensor with a housing, a carriage movable in a guide in the housing, and at least one measurement probe arranged on the carriage for picking up a measurement signal as a function of the position of the carriage.

The guide can be embodied, for example, so that the carriage can be moved in a sliding fashion.

The measurement probe can be a non-contacting pick-up element or a contacting pick-up element, e.g., a slider or the like.

2. Discussion of the Prior Art

Such position sensors are known from a wide variety of technical fields. The sensors serve as linear displacement gauges to determine position, for example. Frequently, these position sensors are linear displacement gauges that work on a potentiometric, capacitive or inductive basis.

For example German reference, DE 26 29 294 A1 discloses a linear variable resistance aggregate, in which the measurement probe and a sliding carriage are rigidly connected to each other. The sliding carriage can be moved from the outside via a handle, while the measurement probes are pick-up clamps that slide along a resistance track.

Reference DT 24 33 405 B2 discloses an adjustable slide resistor in which the measurement probe, again, is a pick-up element that slides along a resistance track and is rigidly connected to a sliding carriage arranged on the housing.

SUMMARY OF THE INVENTION

DT 25 16 874 A1 discloses a position sensor, in which the measurement probe carrier is arranged separately from the carriage and the carriage guide.

A handle part is connected to a slider spring carrier via two operating journals. These two operating journals do not prevent the introduction of forces acting vertically relative to the movement direction.

In all known position sensors, it is problematic that between the carriage and the measurement probe either there is a rigid connection, or there is a connection that permits forces vertical relative to the movement direction.

By the introduction of transverse forces, i.e., forces that act on the measurement probe (for example, a pick-up element that slides on a resistance track) at a right angle to the movement direction, forces and torques are transmitted to the pick-up element and the resistance track that can disrupt the operation of the position sensor and, in particular, can significantly increase wear and thus shorten the useful life of the position sensor.

The invention is therefore based on the object of improving a generic position sensor in such a way that the position sensor, while being manufactured as simply as possible, ensures reliable and malfunction-free operation with a long useful life. In particular, changes in the narrowly defined distance tolerance between the pick-up elements and the resistance track as the result of tilting moments and transverse forces acting on the carriage are to be avoided. In addition, wear on the measurement probe due to such external influences is to be generally avoided.

This object is attained in a position sensor of the type described above by virtue of the fact that the measurement probe has a measurement probe carrier that moves in the housing, is separate from the carriage and the cage guide, and is connected to the carriage and the carriage guide in such a way that force can only be transmitted parallel to the movement direction.

This additional measurement probe carrier, which moves in the housing separately from the carriage and the carriage guide, allows the measurement probe to be guided on the measurement probe carrier independently of the carriage guide. The measurement probe carrier can be connected to the carriage and the carriage guide in such a way that force can only be transmitted parallel to the movement direction. The connection of the measurement probe carrier to the carriage and the carriage guide ensures, firstly, that the measurement probe carrier, and thus the measurement probe, is accurately taken along by the carriage. Secondly, this connection ensures that no transverse forces or moments acting other than in the movement direction are transmitted to the measurement probe. Therefore, such forces or moments cannot cause malfunctions during the operation of the position sensor, nor can the measurement probe or indeed the entire position sensor be damaged or the useful life of the position sensor reduced by such forces.

In principle, the measurement carrier can be connected to the carriage and the carriage guide in a wide variety of ways.

In a solution that is especially advantageous with respect to manufacturing costs and reliable long-term operation, a guide plate with an elongated hole, which runs substantially vertically relative to the movement direction, is arranged on the measurement probe carrier. Into the elongated hole engages a take-along pin, which is connected to the carriage and whose diameter corresponds substantially to the diameter of the elongated hole. The elongated hole and the take-along pin permit force to be transmitted from the carriage to the measurement probe carrier, and thus to the measurement probe, in the movement direction only. No transverse forces or torques that act laterally on the carriage and vertically relative to the movement direction are transmitted to the measurement probe carrier, because slight tiltings of the carriage, which cause the take-along pin to tilt in the elongated hole, cannot exercise a force of any kind to the measurement probe carrier.

In principle, the guide plate can be arranged on the measurement probe carrier at any desired location However, it is especially advantageous for the guide plate to be arranged substantially at the center of gravity of the measurement probe carrier. Doing so permits a centric application of force on the measurement probe carrier, and therefore avoids any tilting moment (such as can occur, for example, given an eccentric application of force to the measurement probe carrier). Thus, any increase in friction or wear due to such tilting moment is avoided as well.

The movable arrangement of the measurement probe carrier in the housing can be embodied in many different ways. For example, the measurement probe carrier can have at least two sliding feet, which can be moved into complementary recesses in the housing.

Preferably, the measurement probe carrier has four sliding feet, because this ensures especially good sliding properties and, in addition, prevents tilting of the measurement probe carrier.

In principle, a certain amount of wear cannot be ruled out completely in any type of sliding guide. Over time, such wear can create and/or increase play between the sliding feet and the recesses in the housing, for example, resulting in inaccurate guidance of the measurement probe carrier in the housing. To compensate for this increase over tune in bearing play, the sliding feet are advantageously arranged, on at least one side, in an elastically prestressed manner, so that an increase in bearing play can be continuously compensated for.

The measurement probe can be embodied and connected to the measurement probe carrier in a wide variety of ways.

With respect to reliable function and easy manufacture, in particular, the measurement probe is advantageously connected to the measurement probe carrier in one-piece fashion and has at least one pick-up element, which is located across from at least one pick-up track arranged in the housing.

Purely in terms of principle, the measurement probe, the measurement probe carrier and the pick-up element connected to the measurement probe carrier can be embodied in a wide variety of ways.

In the case of a potentiometric position sensor, for example, the pick-up element can slide or wipe on the pick-up track. In this case, the measurement probe carrier is a slide carrier with a pick-up element embodied as a slider.

In the case of non-contacting pick-up, however, it is also possible for an air gap to be located between the pick-up element and the pick-up track. This is the case, for example, with a capacitive or an inductive position sensor.

Further features and advantages of the invention are the subject matter of the following description as well as of the drawing of an example.

The drawing shows, schematically, a partially sectioned view of a position sensor according to the invention.

As the drawing shows, a position sensor 10 comprises a housing 20, in which a carriage in the form of a sliding carriage 30 can be moved in sliding fashion by a sliding carriage guide 31. As illustrated, the sliding carriage guide 31 can comprise a support element 33 similar to a double-T carrier, for example, into which engage projections 32, which are embodied in one-piece fashion on the housing 20. The support surfaces of the support element 33 can thereby rest on the projections 32 at only a few predetermined points, as illustrated by surfaces 34a and 34b in the drawing, for example. This type of sliding carriage guide 31, which is simply manufactured and structured, ensures that the sliding carriage 30 is accurately guided in the movement direction, i.e., perpendicular vertically relative to the plane of the drawing.

As the drawing also shows, a measurement probe carrier 40, on which pick-up elements 41 are arranged in one-piece fashion, is located at the lower end of the sliding carriage guide 31. The pick-up tracks 50 are secured in the housing 20 across from the pick-up elements 41.

The measurement carrier 40 has four sliding feet 45, which can be moved into complementary recesses 21 in the housing 20.

The sliding feet 45 are arranged, on at least one side, in an elastically prestressed manner. As a result, should the bearing play change due to wear, automatic readjustment of the bearing play occurs. In this way, malfunction-free and accurate guidance of the measurement carrier 40 in the housing 20, and thus malfunction-free operation of the entire position sensor 10, is ensured over a long period of time.

Arranged in the center of the measurement probe carrier 40 is a guide plate 43, which has an elongated hole 44 that runs substantially perpendicularly relative to the movement direction. Into this elongated hole 44 engages a circular-cylindrical takealong pin 35. The takealong pin 35 is attached to the sliding carriage 30 and has a diameter that corresponds substantially to the diameter of the elongated hole 44.

Connecting the measurement probe carrier 40 to the sliding carriage 30 in this manner ensures, firstly, that the measurement probe carrier 40 is taken along accurately in the movement direction (perpendicular to the plane of the drawing). Secondly, lateral forces that act at a right angle to the movement direction are prevented from tilting the measurement probe carrier 40 or the measurement probe (i.e., the pick-up elements) and thereby increasing wear on the measurement probe. It is also conceivable for this arrangement to compensate for play between the take-along pin 35 and the elongated hole 44 in the measurement probe carrier 40, for example, by means of a leaf spring (not shown) arranged on the measurement probe carrier 40. The leaf spring would act in the movement direction of the sliding carriage 30 and press against the take-along pin 35.

Any tilting that occurs at a right angle to the movement direction and results in a slight tilting of the sliding carriage 30 will cause the takealong pin 35 to tilt only slightly in the elongated slot 44, This does not cause any forces whatsoever to be exerted on the measurement probe carrier 40. Such possible tilting is shown in exaggerated fashion in the drawing in reference to Arrow A.

It is also especially advantageous for the guide plate 42 to be arranged substantially at the center of gravity of the measurement probe carrier 40, because then tilting of any type that could result from torque exercised on the sliding carriage 30, for example, is also avoided. It has been shown that when there is an eccentric application of force to the measurement probe carrier during direction changes, which themselves lead to an increase in load due to sliding/adhesive friction, tilting moment that adds to friction A and wear can occur. However, given a centric application of force, as illustrated, tilting moments of this type are ruled out.

Moreover, electronic switching devices (not shown) can be arranged in cavities 23 provided for this purpose in the housing 20. With the help of these electronic switching devices, the picked-up signals can be immediately processed.

Of course, a position sensor of this type can use a wide variety of measurement principles. For example, the position sensor can be embodied as a potentiometer. However, the position sensor can also be advantageously used in capacitive or inductive measurement processes.

What is claimed is:

1. A position sensor, comprising:

a housing defining a carriage guide;

a carriage movably arranged in the guide in the housing;

measurement probe means arranged on the carriage for transmitting a measurement signal as a function of a position of the carriage, the measurement probe means including a measurement probe carrier separated from the carriage guide and movably arranged in the housing, the measurement probe carrier being connected to the carriage and the carriage guide so that a force can only be transmitted to the measurement probe carrier parallel to a movement direction of the carriage;

a guide plate arranged on the measurement probe carrier, the guide plate having an elongated hole which runs substantially perpendicularly relative to the movement direction; and a take-along pin connected to the carriage and arranged in the elongated hole, the pin having a diameter that substantially corresponds to a diameter of the elongated hole.

2. A position sensor as defined in claim 1, wherein the guide plate is arranged substantially at a center of gravity of the measurement probe carrier.

3. A position sensor as defined in claim 1, wherein the measurement probe carrier has at least two sliding feet that are movably arranged in complementary recesses in the housing.

4. A position sensor as defined in claim 3, wherein the measurement probe carrier has four sliding feet.

5. A position sensor as defined in claim 3, wherein the sliding feet are arranged in an elastically prestressed fashion on at least one side of the measurement probe carrier.

6. A position sensor, comprising:

a housing defining a carriage guide;

a carriage movably arranged in the guide in the housing; and measurement probe means arranged on the carriage for transmitting a measurement signal as a function of a position of the carriage the measurement probe means including a measurement probe carrier separated from the carriage and the carriage guide and movably arranged in the housing, the measurement probe carrier being connected to the carriage and the carriage guide so that a force can only be transmitted to the measurement probe carrier parallel to a movement direction of the carriage, the measurement probe means including a pick-up track arranged in the housing and a measurement probe connected with the measurement probe carrier, the measurement probe comprising at least one pick-up element located across from the pick-up track arranged in the housing.

7. A position sensor as defined in claim 6, wherein the pick-up element is arranged so as to one of slide and wipe on the pick-up track.

8. A position sensor as defined in claim 6, wherein the pick-up element is arranged so that an air gap is located between the pick-up element and the pick-up track.

* * * * *